Dec. 12, 1961     F. P. MUNGOVAN     3,012,819
REMOVABLE HEAD REST FOR VEHICLES
Filed Sept. 25, 1959
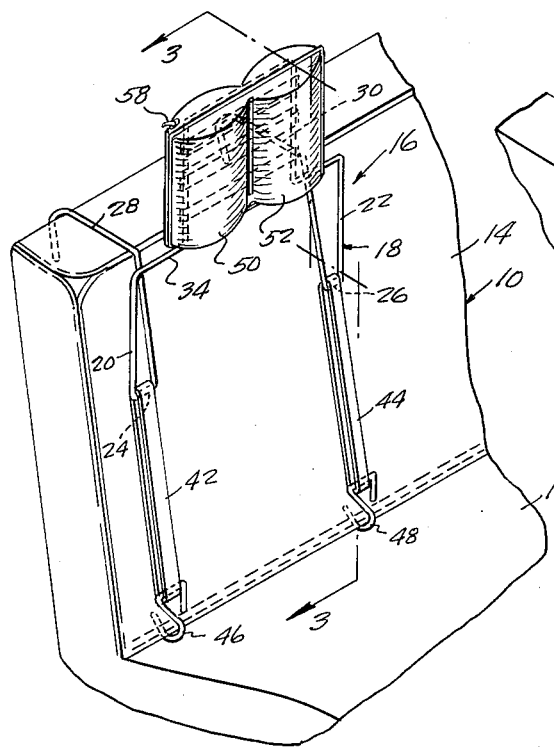
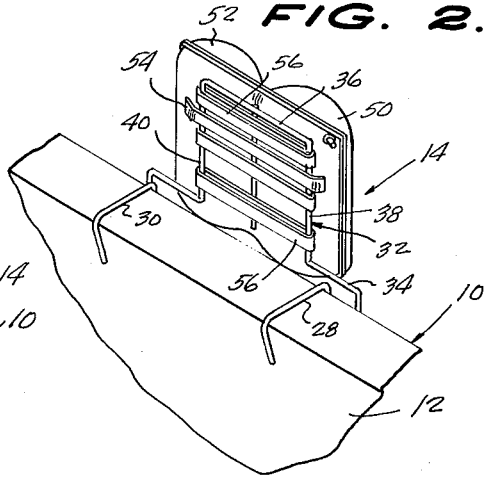
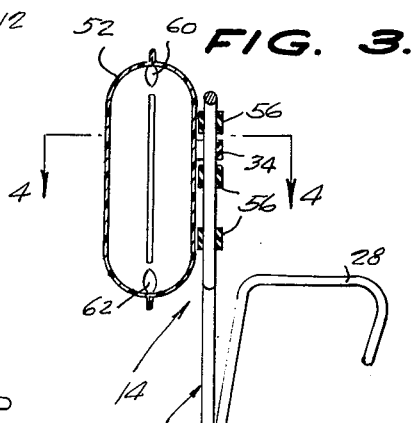
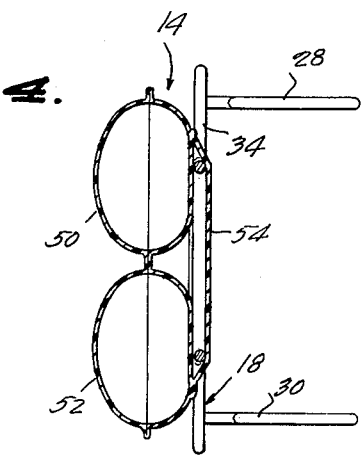
INVENTOR.
FRANCIS P. MUNGOVAN,
BY
McMorrow, Berman & Davidson
ATTORNEYS.

United States Patent Office 3,012,819
Patented Dec. 12, 1961

3,012,819
REMOVABLE HEAD REST FOR VEHICLES
Francis P. Mungovan, 56 Connelly Ave., Buffalo 15, N.Y.
Filed Sept. 25, 1959, Ser. No. 842,377
3 Claims. (Cl. 297—399)

The present invention relates to a removable head rest for a vehicle.

Previously proposed and presently in use are head rests adapted to be supported upon the top of the back of an automobile seat for the purpose of giving support and comfort to the passenger occupying the seat. Not all such head rests as have been proposed have been successful for many reasons. The principal defect in such head rests resides in the bulkiness and need for a comparatively large place for storing the head rest when it is not in use. Another defect resides in the unsightliness of the head rest proposed. Additionally, the head rests that have been suggested are usually designed for attachment to the seat back of a particular automobile of particular year and model.

An object of the present invention is to provide a head rest for attachment to the top of an automobile seat back which is universally usable with all makes of automobiles and all models.

Another object of the present invention is to provide a head rest for an automobile seat which is compact when deflated and one requiring a minimum of space for storage.

A further object of the present invention is to provide a head rest for attachment to the top of an automobile seat back which is sturdy in construction, one simple in structure requiring no special tools for attaching it to the seat back, one which lends itself to manufacture in quantity at reasonable cost, and one which is highly effective in action.

These and other objects and advantages of the present invention will be fully apparent from the following description when taken in conjunction with the annexed drawing, in which:

FIGURE 1 is an isometric view of a fragmentary portion of an automobile seat with the head rest of the present invention installed thereon, as viewed from the front and one side;

FIGURE 2 is an isometric view of the assembly shown in FIGURE 1, as viewed from the rear and one side;

FIGURE 3 is a view taken on the line 3—3 of FIGURE 1 and on an enlarged scale; and FIGURE 4 is a view taken on the line 4—4 of FIGURE 3.

Referring in greater detail to the drawing in which like numerals indicate like parts throughout the several views, the reference numeral 10 designates generally an automobile seat having a seat 12 and a back 14 rising from the seat 12.

The head rest of the present invention comprises an upstanding frame 16 consisting in an inverted U-shaped main portion 18. The main portion 18 has legs 20 and 22 each bent inwardly to form hanger elements 24 and 26.

Hook members 28 and 30, each adapted to embrace the top portion of the seat back 14, are rigidly connected to each of the hanger elements 24 and 26, respectively.

The frame 16 also includes a subsidiary inverted U-shaped portion 32 positioned so as to extend above the bight 34 of the frame main portion 18 with the bight 36 thereof parallel to the bight 34 of the main portion 18. The free ends of the side pieces 38 and 40 of the subsidiary portion 32 are rigidly connected to the midportion of the bight 34 of the main portion 18.

Elastic bands 42 and 44, each constituting a strap means, are carried by the hanger elements 24 and 26, respectively, and have hooks 46 and 48 adapted to releasably engage the bottom portion of the seat back 14, as shown most clearly in FIGURE 1.

A pair of inflated bags 50 and 52 are arranged in lateral side by side relation and are shaped to a head rest. The bags 50 and 52 are positioned so that they extend across one face of the subsidiary frame portion side pieces 38 and 40 which are adjacent to and extend upwardly above the top of the seat back 14.

An elastic strip 54, constituting elastic means, extends from the bag 50 to the bag 52 on the back thereof and is engageable with the side pieces 38 and 40 of the subsidiary frame portion 32 for holding the bags 50 and 52 in position on the side pieces 38 and 40.

On opposite sides of the strip 54 are elastic bands 56 stretched over the side pieces 38 and 40 and together forming a resilient backing for the bags 50 and 52.

An inlet valve 58 is provided in the bag 50 for admitting air to bags 50 and 52, such bags being joined internally by passages 60 and 62, as in FIGURE 3.

In use, the head rest of the present invention is positioned so that the main portion 18 of the frame 16 is adjacent the front of the seat back 14 with the side pieces 38 and 40 of the subsidiary frame portion 32 extending upwardly from the top of the seat back 14 and with the hook members 28 and 30 embracing the top of the seat back 14. The bands 42 and 44 accommodate themselves to stretching so that the hooks 46 and 48, respectively, may embrace and engage the bottom portion of the seat back 14, as shown in FIGURE 1.

The bags 50 and 52 are inflated by any conventional means and are positioned so as to extend across the front face of the subsidiary frame portion side pieces 38 and 40. The resilient elastic strip 54 forms a means for detachably or releasably securing the bags 50 and 52 to the side pieces 38 and 40 when they are inflated.

Upon deflation of the bags 50 and 52 and unhooking of the hooks 46 and 48 from the bottom of the seat back 14, the device may be folded compactly and the bags 50 and 52 removed from the subsidiary frame portion side pieces 38 and 40 and stored separately or with the main frame portion 18, as desired.

What is claimed is:

1. The combination with an automobile seat including a seat and a back rising from said seat, of a head rest comprising an upstanding frame including a pair of laterally spaced side pieces arranged so that the side pieces are adjacent to and extend upwardly above the top of said back, an inflated bag shaped to a head rest positioned so that the bag extends across one face of the projecting side pieces, elastic means on the back of said bag and engageable with said side pieces for holding said bag in position on said side pieces, an elastic band on opposite sides of said elastic means and stretched over said side pieces and together forming a resilient backing for said bag, a pair of hooks on said frame and releasably engageable with the top portion of said back, and strap means carried by said frame and releasably engageable with the bottom portion of said back.

2. The combination with an automobile seat including a seat and a back rising from said seat, of a head rest comprising an upstanding frame comprising an inverted U-shaped main portion, the free end of each of the legs of said main portion being bent inwardly to form a hanger element, a hook member adapted to embrace the top portion of said back and rigidly connected to each of said hanger elements, a subsidiary inverted U-shaped portion positioned so as to extend above the bight of said main portion with the bight parallel to the bight of said main portion and having the free ends of the side pieces rigidly connected to the midportion of the bight of said main portion, a strap means carried by each of said hanger elements and each having a hook adapted to releasably engage with the bottom portion of said back, said frame being positioned so that the main portion is adjacent the front of said back with the side pieces of said subsidiary portion extending upwardly from the top of said back, the hook members embracing the top of said back and the hooks embracingly engaging the bottom portion of said back, and an inflated bag shaped to a head rest positioned so as to extend across the front face of said side pieces and releasably secured thereto.

3. The combination with an automobile seat including a seat and back rising from said seat, of a head rest comprising an upstanding frame comprising an inverted U-shaped main portion, the free end of each of the legs of said main portion being bent inwardly to form a hanger element, a hook member adapted to embrace the top portion of said back and rigidly connected to each of said hanger elements, a subsidiary inverted U-shaped portion positioned so as to extend above the bight of said main portion with the bight parallel to the bight of said main portion and having the free ends of the side pieces rigidly connected to the midportion of the bight of said main portion, a strap means carried by each of said hanger elements and each having a hook adapted to releasably engage with the bottom portion of said back, said frame being positioned so that the main portion is adjacent the front of said back with the side pieces of said subsidiary portion extending upwardly from the top of said back, the hook members embracing the top of said back and the hooks embracingly engaging the bottom portion of said back, an inflated bag shaped to a head rest positioned so as to extend across the front face of said side pieces and releasably secured thereto, elastic means on the back of said bag and engageable with said side pieces for holding said bag in position on said side pieces, and an elastic band on opposite sides of said elastic means and stretched over said side pieces and together forming a resilient backing for said bag.

References Cited in the file of this patent

UNITED STATES PATENTS

| | | |
|---|---|---|
| 984,220 | Hilton | Feb. 14, 1911 |
| 2,056,479 | Newman | Oct. 6, 1936 |
| 2,605,818 | Dabbs et al. | Aug. 5, 1952 |
| 2,897,878 | Mungovan | Aug. 4, 1959 |